April 26, 1960           E. SAUER           2,933,991

REFLEX CAMERA WITH PHOTOELECTRIC METER

Filed April 12, 1957           3 Sheets-Sheet 1

INVENTOR.
Edgar Sauer
BY Singer, Stern & Carlberg
Attorneys

April 26, 1960 E. SAUER 2,933,991
REFLEX CAMERA WITH PHOTOELECTRIC METER
Filed April 12, 1957 3 Sheets-Sheet 2

INVENTOR.
Edgar Sauer
BY
Singer, Stern & Carlberg
Attorneys

INVENTOR.
Edgar Sauer

United States Patent Office 2,933,991
Patented Apr. 26, 1960

2,933,991

REFLEX CAMERA WITH PHOTOELECTRIC METER

Edgar Sauer, Stuttgart, Germany, assignor to Zeiss Ikon A.G. Stuttgart, Stuttgart, Germany Application April 12, 1957, Serial No. 652,579

Claims priority, application Germany April 14, 1956

8 Claims. (Cl. 95—10)

The invention relates to improvements in single lens mirror reflex cameras provided with a built-in photoelectric exposure meter.

It is an object of the invention to provide a camera of the type mentioned and whose finder system is provided with a roof-top prism to show the image of the subject to be photographed upright and the sides thereof correctly positioned with optical means which project an image of the indicator hand of the measuring instrument of the exposure meter into at least approximately the plane of the finder image plane.

Another object of the invention is to provide a camera of the type mentioned with a readily exchangeable finder screen, so that the customary frosted finder plate may be replaced by a clear plate for the purpose of making micro photographs of small objects which cannot be observed clearly when a frosted plate is being used.

Still another object of the invention is to arrange the most important parts of the finder, namely, the roof-top prism, the additional prism and lens for the exposure meter, and the finder image plate in a separate housing to form a complete unit which is readily detachably mounted in the camera casing.

In accordance with the invention the indication of the measuring instrument of the exposure meter is not only visible from the top of the camera casing but also when the picture finder is observed through the customary eye piece mounted in the rear wall of the camera casing because the invention provides means for reflecting an image of the indicator hand of the mentioned measuring instrument into the roof-top prism of the view finder which produces from the subject to be photographed an upright picture with correctly placed sides in the view finder. The mentioned roof-top prism is employed for the purpose of directing an image of the indicator hand of the mentioned measuring instrument at least approximately into a plane in which the view finder, screen or plate is arranged.

The eye which observes the view finder in view of the optical planes within the latter will observe in addition to the image of the object to be photographed also an image of the mentioned indicator hand of the measuring instrument. As long as the viewing rays remain within the roof-top prism these rays have the same length. A difference in these lengths will appear when a viewing ray intended for the indicator hand leaves the prism and is directed over an additional reflector on to the indicator hand. The path of the viewing ray for the finder image extends from the mentioned point where it leaves the prism partly within the latter and after leaving the prism it reaches, if necessary, by means of interposing a field lens the finder image plane. In order to compensate the two last mentioned different lengths of the rays the present invention employs optical means arranged at least in one of these paths of rays and these optical means, according to the prevailing dimensions of the camera and the optical elements therein, may either be a collective lens or a disbursing lens.

According to the invention these features selected have a number of important advantages. There is obtained a very intimate close unification of the finder ray path with those rays coming from the measuring instrument, particularly its indicator hand so that the reflecting faces in the finder with the exception of one, are employed for the desired image of the indicator hand which is to be projected into the plane of the image screen. It is to be noted that for these reflecting faces no special elements are necessary to support the same. At the same time the space required for directing an image of the indicator hand into the finder is reduced to the smallest possible size. In spite of this compact finder and measuring instrument arrangement it is possible to arrange the finder and the measuring image in spaced relation from one another so that these parts may be treated as independent elements and may be separately arranged in a housing and then inserted into the camera casing. The combination of these two parts, namely, the measuring instrument and the finder takes place only in an optical manner and not at all in a mechanical manner so that from the viewpoint of manufacture there is obtained a substantial simplification in the manufacture not only of these two parts but also of the entire camera itself. Any differences in the measurements between these two separate units are at the most very minor and could be easily compensated for or may even be disregarded without changing the function or the cooperation between these parts. Furthermore, the finder requires in addition to the mentioned roof-type prism only a single additional mirror for directing an image of the indicator hand of the measuring instrument into the finder itself. This additional mirror is suitably arranged in such an inclined position that the mirror also compensates for any plunging lines which in view of the inclined position of the mirror may appear in the finder.

The effect of the mentioned plunging lines of the image of the indicator hand may also be compensated in the following manner:

It is possible to provide the indicating hand of the measuring instrument between its ends and in the plane in which it moves or oscillates with an angular bend. When this is done the angled portion of the indicator hand appears in the window of the camera casing no longer parallel to the longitudinal direction of the camera casing, but at an angle thereto but in the image of the indicator hand appearing in the finder it will appear parallel to the longitudinal side of the image finder.

It is also an object of the invention to insert the inclined mirror and the measuring instrument of the exposure meter in a separate housing and then insert this housing with the mentioned parts therein as a unit in the camera casing. In this case at least a portion of the mentioned housing within the range of the indicator hand is made transparent.

Still another object of the invention is to additionally illuminate the measuring instrument window by rays entering the window of the exposure meter and deflected into the finder. For this purpose there may be arranged above the window through which the measuring instrument is observed from above an inclined hinged reflector which directs light rays coming from the subject to be photographed into the mentioned window to illuminate the neighborhood of the indicator hand so that the image of the indicator hand in the finder will appear very clearly and distinctly.

Other and further objects and novel features of the present invention will be apparent from the following detailed description thereof taken in connection with the accompanying drawings in which.

Figure 1:
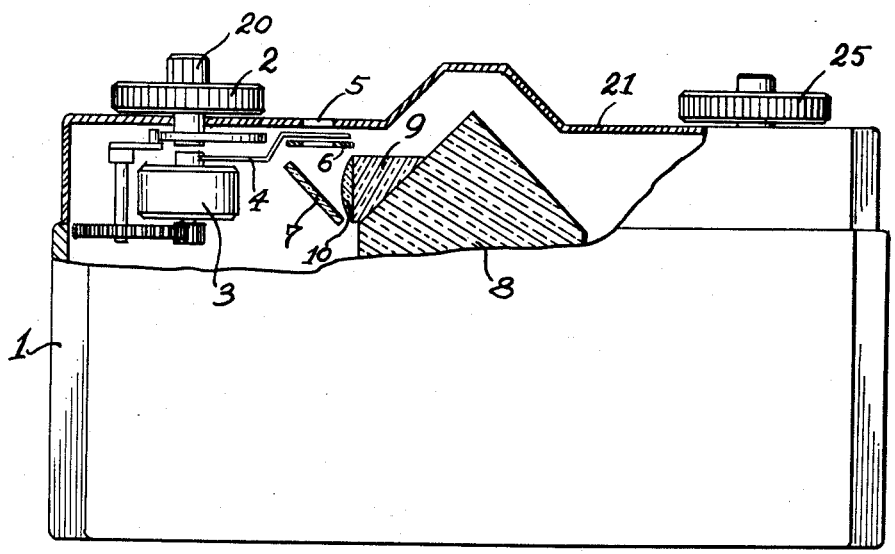
Fig. 1 is a rear view of a single lens mirror reflex camera with a portion of the rear wall broken away to disclose the measuring instrument of the exposure meter and a portion of the view finder.
Figure 2:
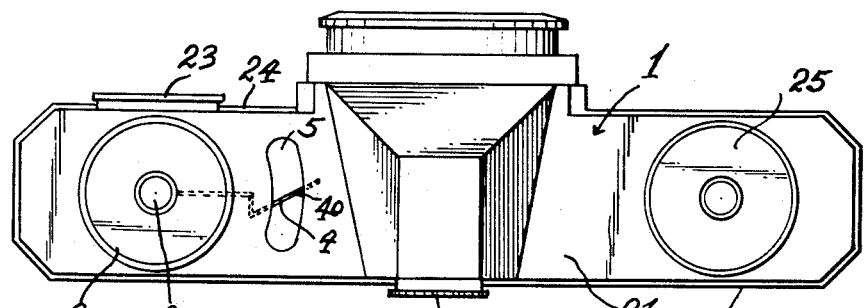
Fig. 2 is a top view of the camera.

Referring to Figs. 1 and 2, the mirror reflex camera is provided on its top wall 21 with a film advancing knob 25 and a film rewind knob 20. Coaxially with the latter is arranged within the camera casing 1 the measuring instrument 3 of the photoelectric exposure meter. The measuring instrument 3 is provided with a pivotally mounted indicator hand 4, the outer portion of which is visible from the outside through a suitable window 5 arranged in the top wall 21 of the camera casing 1. A supplemental diaphragm 6 is arranged below the indicator hand and the window 5. A mirror 7 reflects an image of the indicator hand 4 into the roof-top prism 8 of the view finder arranged centrally in the upper portion of the camera casing. A prism 9 is mounted on that inclined face of the roof-top prism 8 which faces the mirror 7. Within the range of its engagement surface with the roof-top prism 8 the prism 9 avoids a reflection of the rays, so that the finder rays within the area of this surface are not reflected to the finder adjustment plane, but are permitted to pass in the direction of the incoming rays from the indicator hand. The surface of the prism 9 facing the mirror 7 carries a positive lens 10 which shortens the optical length of the path of the indicator hand rays. Depending upon the dimensions of the camera casing, the measuring instrument and the roof-top prism, the positive lens may be replaced by a negative lens which makes the mentioned optical path longer, if that should be required.

The inclined position of the reflecting faces of the roof-top prism 8 gives rise to the appearance of plunging lines in the reflected image of the indicator hand 4. Therefore, the hand which in the window 5 appears to be parallel to the longitudinal axis of the camera, appears in the finder image at an incoming angle which is different from 90° with respect to the boundary lines of the finder area formed usually of a frosted screen image finder plate. By a suitable position of the mirror 7 this effect can be compensated for to a very great extent. It is also possible to give the indicator hand 4 the particular bent shape as shown in Fig. 2, so that the reflected image appearing on the frosted screen image finder plate will be parallel or at right angles respectively, to the boundary lines of the finder area.

Figure 3:
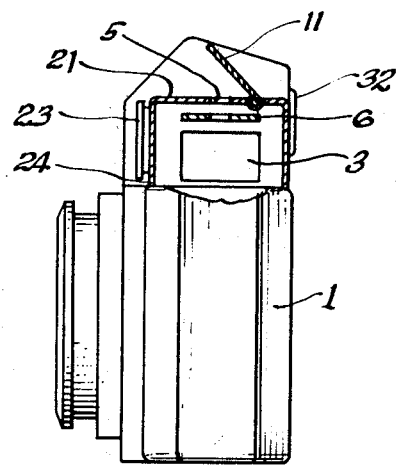
Fig. 3 is an end view with a portion of the camera casing broken away.

For the purpose of directing light from the subject photographed to the neighborhood of the indicating hand 4, so as to brighten it up, there is provided, according to Fig. 3, a pivotally mounted mirror 11 on the top wall 1a of the camera casing, which mirror when tilted upwardly as shown, deflects light into the window 5.

Figure 4:
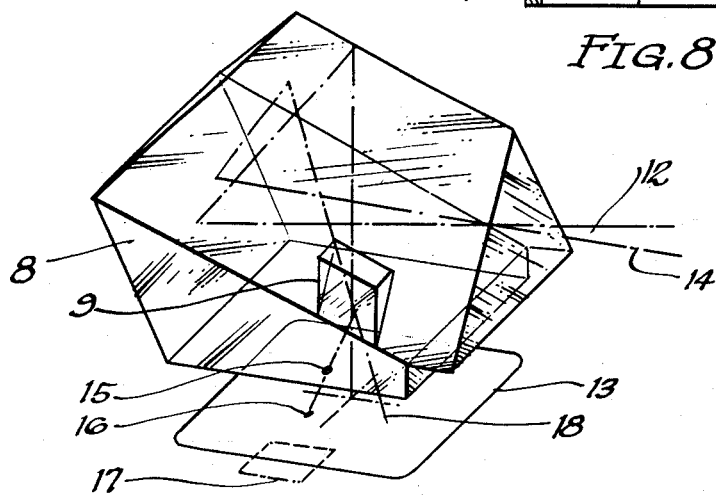
Fig. 4 is a perspective view of the roof top prism forming a part of the view finder and having attached thereto an additional prism forming a part of the arrangement for permitting a reading of the exposure meter in the finder image.

Fig. 4 is a perspective view of the roof-top prism 8 of the view finder. The dash and dotted line 12 indicates the center ray path which is reflected from the center of the frosted screen image finder plate 13 through the prism 8. The other dotted line 14 indicates the path of rays through the prism 8 in the direction toward the eye of the observer.

Figure 5:
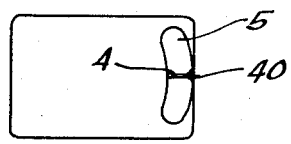
Fig. 5 is a view of the finder image with an image of the indicator hand of the measuring instrument of the exposure meter.
Figure 8:
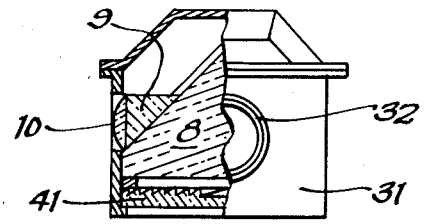
Fig. 8 is a rear view, partly in section, of the removable finder unit used in Fig. 7.

At the areas of the left hand face of the roof-top prism 8 which are not covered by the additional prism 9 there takes place a reflection of the ray 14 in the direction from the point 15, in that it enters the lower face of the roof-top prism 8 and is in effect a reflection of the point 16 on the frosted screen image finder plate 13. The range of this area is as large as the image finder plate, but when the prism 9 is attached to the prism 8 the area is rectricted by the portion which is indicated at 17. An image of the window 5 and of the indicator hand 4 appears as shown in Fig. 5. Of course, the observation of the frosted screen image finder plate takes place by means of an eyepiece lens 32 mounted in the rear wall 22 of the camera casing.

Light rays pass through the window 5 and form an image of the window 5 and indicator pointer 4 which are reflected by the mirror 7 in the direction of the lens 10 where they are again reflected downwardly by the prisms 9 and 8 to form an image on the frosted screen image finder plate 13 at the marginal portion thereof as indicated in Figure 5.

At the area of the lefthand face of the roof-top prism 8 which is covered by the prism 9 the image of the window 5 and indicator pointer 4 traveling along the line of the ray 14 through the prism 8 in the direction of the eyepiece 32 so that the window 5 and the indicator hand 4 appearing therein along with the reflection of the objective image will become visible through the eyepiece 32 to the observer. The hinged cover 23 for the photoelectric cell is arranged on the front wall 24 of the camera casing 1.

Figure 6:
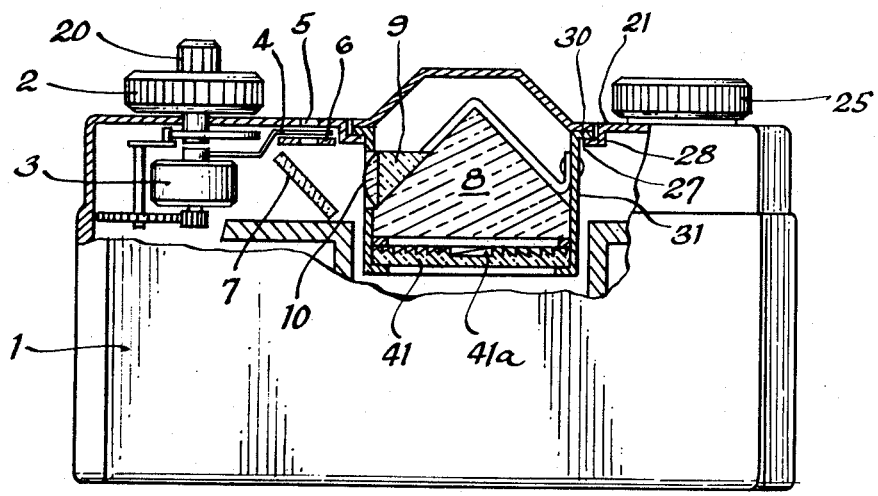
Fig. 6 shows a modification of the camera, namely, a rear view similar to Fig. 1.

Fig. 6 discloses a modified embodiment of the camera in which certain parts of the finder, namely, the roof-top prism, the frosted image finder screen plate 41 and the supplemental prism and lens for the indicator hand of the exposure meter are arranged in the form of a readily exchangeable unit in the camera casing. The top wall 21 of the camera casing 1 is provided with a rectangular aperture 27 formed by a right angular rim 28 for receiving a corresponding outwardly extending flange 30 on a readily removable housing 31 having a portion extending downwardly into the camera casing 1. The housing 31 contains the roof-top prism 8 with the additional prism 9 and lens 10 thereon and also the frosted image finder screen plate 41, which may be arranged to be independently replaceable in said housing 31. Of course, the eyepiece lens 32 is also attached to said housing 31 in the correct position. The finder screen plate 41 is provided in its center with a pair of optical wedges 11a forming means for correctly indicating the proper focusing of the camera lens. This frosted screen image finder plate 41, 41a has also a Fresnel lens effect and may be readily replaced by a clear plate or by another Fresnel lens plate having a different focal length.

The exchangeable unit 8, 9, 10, 11, 31 may also be provided with indications of the exposure values for the camera, such as filter factors and diaphragm and shutter speeds for which the camera may be adjusted.

Figure 7:
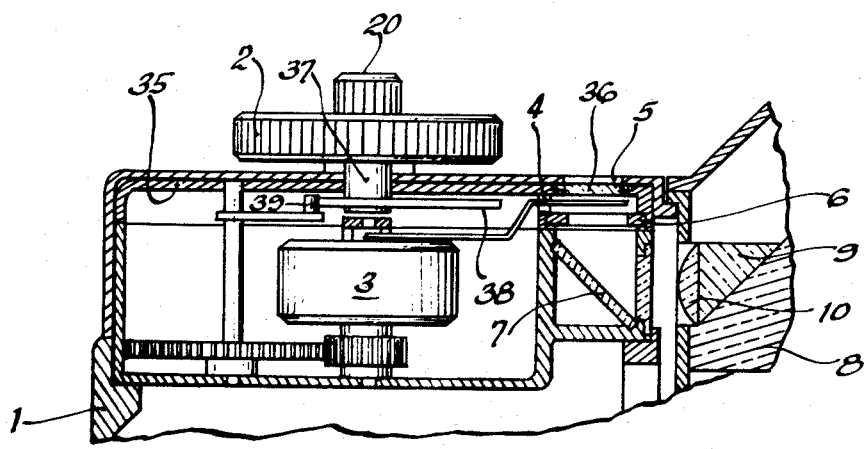
Fig. 7 shows another modification in which the measuring instrument and the deflecting mirror for the same are constructed as a separate unit.

In similar manner it is also possible, as shown in Figure 7, to provide a separate housing 35 in which the measuring instrument 3 of the exposure meter and the inclined mirror 7 are mounted to form another independent unit which may be inserted into the camera casing 1. In this case a portion 36 of the housing containing the measuring instrument 3 and the mirror 7 is made transparent so that the indicator hand 4 of the measuring instrument 3 may be observed.

The film rewind knob 20 is arranged normally within a central socket of the adjustment knob 2, but is axially extendable for manual rotation. The adjustment knob 2 is attached after insertion of the exposure meter to the shaft 37 which actuates the cam drive 38, 39, and therewith the measuring instrument 3 until the hand 4 points to a fixed mark 40.

What I claim is:

1. In a single lens mirror reflex camera including a camera casing, the combination with a built-in view finder in said casing provided with a roof top prism in the upper portion of said casing and an image viewing screen in said casing, of an electrical exposure meter mounted in said casing on one side of said prism having a measuring instrument with a movable indicator hand, said casing being provided with a top wall having a window therein adjacent said exposure meter beneath which said indicator hand is arranged to sweep to and fro, and reflector means within said casing below said window and indicator hand for reflecting light rays passing through said window to produce an image of said window and the portion of said indicator hand appearing therein for projection into said roof top prism, and additional prism means arranged between said reflecting means and roof top prism for directing said image substantially into the plane of said image viewing screen.

2. In a single lens mirror reflex camera including a camera casing, the combination with a built-in view finder in said casing provided with a roof top prism in the upper portion of said casing and an image viewing screen in said casing, of an electrical exposure meter mounted in said casing offset to one side of said prism having a measuring instrument with a movable indicator hand mounted in said casing on one side of said prism, said casing being provided with a top wall having a window therein adjacent said exposure meter beneath which said indicator hand is arranged to sweep to and fro, and reflector means within said casing below said window for reflecting light rays passing downwardly through said window to produce an image of said window and the portion of said indicator hand appearing therein into said roof top prism, and a supplemental prism mounted on said roof top prism and arranged between said reflector means and said roof top prism, and a lens on one wall of said supplemental prism between said reflecting means and supplemental prism for directing said last mentioned image substantially downwardly and onto the plane of said image viewing screen.

3. In a single lens mirror reflex camera including a camera casing, the combination with a built-in view finder provided with a roof top prism in the upper portion of said casing and an image viewing screen in said casing, of an electrical exposure meter mounted in said casing offset to one side of said prism and having a measuring instrument with a movable indicator hand mounted in said casing on one side of said prism, said camera casing having a top wall provided with a window therein beneath which said indicator hand is adapted to sweep to and fro, and means within said casing beneath said window and indicator hand for deflecting light rays passing through said window and to produce an image of said window and the portion of said indicator hand appearing therein for projection into said roof top prism, said means including a mirror forming a unit with said measuring instrument, said roof top prism having means thereon arranged in the path of light rays deflected by said mirror for directing said image downwardly substantially into the plane of said image viewing screen.

4. In a single lens mirror reflex camera including a camera casing, the combination with a built-in view finder provided with a roof top prism in the upper portion of said casing, and an image viewing screen in said casing, of an electrical exposure meter mounted in said casing offset on one side of said prism having a measuring instrument with a movable indicator hand, said casing being provided with a top wall having a window therein adjacent said exposure meter beneath which said indicator hand is adapted to sweep to and fro, and means within said casing beneath said window and indicator hand for deflecting light rays passing through said window and to produce an image of said window and the portion of said indicator hand appearing therein for projection into said roof top prism, and additional prism means mounted between said deflecting means and said roof top prism for directing said image substantially into the plane of said image viewing screen, said indicator hand being angularly bent between its ends in its plane of movement to compensate for any plunging lines in its image appearing in the finder.

5. In a single lens reflex camera including a camera casing, the combination with a built-in view finder provided with a roof top prism mounted in the upper portion of said casing and an image viewing screen, of an electrical exposure meter mounted in said casing on one side of said prism having a measuring instrument with a movable indicator hand, said casing being provided with a top wall having a window beneath which said indicator hand is adapted to sweep to and fro, and means within said casing beneath said window and indicator hand for deflecting light rays passing downwardly through said window and to produce an image of said window and the portion of said indicator hand appearing therein for projection toward said rooftop prism, additional prism means on the side wall of said rooftop prism for directing said image substantially into the plane of said image viewing screen, and a reflector mounted above said window on the top wall of said camera casing positioned to receive light rays from the direction in which the camera is pointed and for illuminating the neighborhood of the indicator hand.

6. In a single lens mirror reflex camera including a camera casing, the combination with a built-in view finder provided with a roof top prism mounted in the upper portion of said casing and an image viewing screen in said camera, of an electrical exposure meter mounted in said casing offset to one side of said prism having a measuring instrument with a movable indicator hand, said casing being provided with a top wall having a window therein adjacent said exposure meter beneath which said indicator hand is arranged to sweep to and fro, and reflector means within said casing beneath said window and indicator hand for deflecting light rays passing downwardly through said window to produce an image of said window and the portion of said indicator hand appearing therein for projection toward said roof top prism, additional prism means on one of the sloping walls of said roof top prism for directing said image substantially into the plane of said image viewing screen, and a housing detachably inserted into said camera casing and having mounted therein said roof top prism, said means for reflecting an image of said window and the portion of the indicator hand appearing therein, and said image viewing screen, whereby said housing together with the parts mounted therein may be removed from and inserted respectively into said camera casing as a unit.

7. A single lens mirror reflex camera as claimed in claim 6, including means for removably mounting said image viewing screen in said detachable housing.

8. In a single lens mirror reflex camera including a camera casing, the combination with a built-in view finder provided with a roof top prism mounted in the upper portion of said casing and an image viewing screen in said casing, of an electrical exposure meter mounted in said casing offset to one side of said prism having a measuring instrument with a movable indicator hand, said casing being provided with a top wall having a window therein adjacent said exposure meter beneath which said indicator hand is arranged to sweep to and fro, and reflector means within said casing for deflecting light rays passing through said window to produce an image of said window and the portion of said indicator hand appearing therein for reflection into said roof top prism, a wedge-shaped prism on one of the sloping walls of said roof top prism for directing said image substantially into the plane of said image viewing screen, and a housing detachably inserted in said camera casing and having mounted therein an eyepiece lens, said roof top prism, said means for deflecting an image of said window and the portion of the indicator hand appearing therein, and said image viewing screen, whereby said housing together with the parts mounted therein may be removed from and inserted respectively into said camera casing as a unit.

References Cited in the file of this patent
UNITED STATES PATENTS

| | | |
|---|---|---|
| 2,556,431 | Mihalyi | June 12, 1951 |
| 2,784,654 | Meyer | Mar. 12, 1957 |